(12) United States Patent
Rajashekharaiah et al.

(10) Patent No.: US 11,459,927 B2
(45) Date of Patent: Oct. 4, 2022

(54) HYBRID DOSER

(71) Applicant: Faurecia Emissions Control Technologies, USA, LLC, Columbus, IN (US)

(72) Inventors: Shashidhara Rajashekharaiah, Columbus, IN (US); Edward Kinnaird, Columbus, IN (US); Atul Shinde, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 17/106,419

(22) Filed: Nov. 30, 2020

(65) Prior Publication Data

US 2022/0170399 A1 Jun. 2, 2022

(51) Int. Cl.
| | |
|---|---|
| *F01N 3/20* | (2006.01) |
| *F01N 3/02* | (2006.01) |
| *F01N 5/02* | (2006.01) |
| *B01D 53/94* | (2006.01) |

(52) U.S. Cl.
CPC .......... *F01N 3/208* (2013.01); *B01D 53/944* (2013.01); *B01D 53/9418* (2013.01); *B01D 53/9431* (2013.01); *F01N 3/0205* (2013.01); *F01N 5/025* (2013.01); *F01N 2610/10* (2013.01); *F01N 2610/1453* (2013.01); *F01N 2900/1404* (2013.01); *F01N 2900/1411* (2013.01)

(58) Field of Classification Search
CPC ........ F01N 3/208; F01N 3/0205; F01N 5/025; F01N 2610/10; F01N 26/1453; F01N 2900/1404; F01N 2900/1411; B01D 53/9418; B01D 53/9431; B01D 53/944
See application file for complete search history.

(56) References Cited

U.S. PATENT DOCUMENTS

| | | | |
|---|---|---|---|
| 10,876,454 B2* | 12/2020 | Kinnaird | F01N 9/00 |
| 2013/0259751 A1* | 10/2013 | Maus | B01D 53/9495 422/105 |
| 2013/0259755 A1* | 10/2013 | Kim | F01N 3/208 422/111 |
| 2016/0160725 A1* | 6/2016 | Hudgens | F01N 3/2892 60/274 |
| 2018/0051617 A1 | 2/2018 | Sasaki et al. | |

* cited by examiner

*Primary Examiner* — Phutthiwat Wongwian
*Assistant Examiner* — Diem T Tran
(74) *Attorney, Agent, or Firm* — Carlson, Gaskey & Olds, P.C.

(57) ABSTRACT

An exhaust component assembly for a vehicle exhaust system includes a housing defining an internal cavity configured to receive an exhaust gas after-treatment component. A first chamber is in fluid communication with the internal cavity upstream of the exhaust gas after-treatment component. A first nozzle introduces fluid into the first chamber and a first valve controls flow of the fluid from the first chamber into the internal cavity. A heat source is associated with the first nozzle or first chamber. A second chamber is in fluid communication with the internal cavity upstream of the exhaust gas after-treatment component, and the second chamber is a non-heated chamber. A second nozzle introduces fluid into the second chamber and a second valve controls flow of the fluid from the second chamber into the internal cavity. A controller controls the first and second valves based on at least one predetermined operating condition.

23 Claims, 3 Drawing Sheets

HYBRID DOSER

TECHNICAL FIELD

This disclosure relates generally to a hybrid doser that yields optimal spray characteristics in heated and non-heated operating modes.

BACKGROUND

An exhaust system includes catalyst components to reduce emissions. The exhaust system includes an injection system that injects a diesel exhaust fluid (DEF), or a reducing agent such as a solution of urea and water for example, upstream of a selective catalytic reduction (SCR) catalyst which is used to reduce NOx emissions. The injection system includes a doser that sprays the fluid into the exhaust stream via an injector. Low temperature and low load conditions make it difficult to achieve optimum spray characteristics.

SUMMARY

In one exemplary embodiment, an exhaust component assembly for a vehicle exhaust system includes, among other things, a housing defining an internal cavity configured to receive an exhaust gas after-treatment component. A first chamber is in fluid communication with the internal cavity upstream of the exhaust gas after-treatment component. A first nozzle introduces fluid into the first chamber and a first valve controls flow of the fluid from the first chamber into the internal cavity. A heat source is associated with the first nozzle or first chamber. A second chamber is in fluid communication with the internal cavity upstream of the exhaust gas after-treatment component, and the second chamber is a non-heated chamber. A second nozzle introduces fluid into the second chamber and a second valve controls flow of the fluid from the second chamber into the internal cavity. A controller controls the first and second valves based on at least one predetermined operating condition.

In a further non-limiting embodiment of the foregoing assembly, the at least one predetermined operating condition comprises at least an exhaust gas temperature and/or an exhaust gas flow rate.

In a further non-limiting embodiment of any of the foregoing assemblies, wherein, when dosing is required, the heat source is used for the first chamber and the controller only opens the first valve when the exhaust gas temperature is less than a predetermined temperature and/or the exhaust gas flow rate is below a predetermined flow rate.

In a further non-limiting embodiment of any of the foregoing assemblies, wherein, when dosing is required, the controller closes the first valve and only opens the second valve when the exhaust gas temperature is greater than or equal to the predetermined temperature.

In a further non-limiting embodiment of any of the foregoing assemblies, wherein, when dosing is required, the heat source is used for the first chamber and the controller opens the first valve when the exhaust gas temperature is less than 180° C., and wherein the controller opens the second valve within an exhaust gas temperature transition range between 180° C. and 200° C. such that both the first and second valves are open, and wherein the controller closes the first valve and opens the second valve when the temperature of the exhaust gas is greater than or equal to 200° C.

In a further non-limiting embodiment of any of the foregoing assemblies, the first and second valves provide variable flow, and wherein the controller provides more flow from the first valve if the exhaust gas flow rate is below a predetermined level.

In a further non-limiting embodiment of any of the foregoing assemblies, the first nozzle is different than the second nozzle.

In a further non-limiting embodiment of any of the foregoing assemblies, the heat source comprises an electrical heater and is controlled by the controller.

In a further non-limiting embodiment of any of the foregoing assemblies, the heat source comprises a heat exchanger that recovers heat from exhaust gas flow downstream of the exhaust gas after-treatment component, and including a third valve that is selectively opened by the controller to introduce the fluid from a fluid supply into the heat exchanger to be heated by the exhaust gas flow prior to being introduced into the first chamber.

In a further non-limiting embodiment of any of the foregoing assemblies, a thermo-chemical energy storage unit stores heat recovered from exhaust gas.

In a further non-limiting embodiment of any of the foregoing assemblies, the third valve is upstream of the thermo-chemical energy storage unit such that fluid flows from the fluid supply through the valve and into the thermo-chemical energy storage unit, then into the heat exchanger, and then back into the thermo-chemical energy storage unit such that recovered heat can be stored.

In a further non-limiting embodiment of any of the foregoing assemblies, a fluid supply upstream of the first and second valves, and wherein the fluid comprises DEF.

In another exemplary embodiment, a vehicle exhaust component includes, among other things, a heat source to generate heat to provide a heated mode, a first device to atomize fluid in the heated mode, and a second device to atomize fluid in a non-heated mode. An exhaust component defines an internal cavity that receives atomized fluid from the first and/or second devices dependent upon exhaust gas temperature and/or exhaust gas flow rate.

In another exemplary embodiment, an exhaust component assembly for a vehicle exhaust system includes, among other things, a housing defining an internal cavity configured to receive an exhaust gas after-treatment component. At least one chamber is in fluid communication with the internal cavity upstream of the exhaust gas after-treatment component. A first nozzle introduces fluid from a fluid supply into the at least one chamber and a first valve controls flow of the fluid from the at least one chamber into the internal cavity. A controller controls the first valve based on at least one predetermined operating condition. A heat exchanger recovers heat from exhaust gas flow downstream of the exhaust gas after-treatment component and a second valve is selectively opened by the controller to introduce the fluid into the heat exchanger to be heated by the exhaust gas flow prior to being introduced into the first chamber.

In a further non-limiting embodiment of any of the foregoing assemblies, the at least one chamber comprises only one single chamber, and wherein the exhaust gas after-treatment component is in a close-coupled arrangement at a location that is immediately downstream of an engine or turbocharger.

In a further non-limiting embodiment of any of the foregoing assemblies, the at least one chamber comprises a first chamber that is associated with the first valve and the first nozzle, and a second chamber is in fluid communication with the internal cavity upstream of the exhaust gas aftertreatment component, wherein the second chamber is a non-heated chamber, and including
- a second nozzle to introduce fluid into the second chamber,
- a third valve to control flow of the fluid from the second chamber into the internal cavity, and
- wherein the controller controls the first and third valves based on at least one predetermined operating condition comprising at least an exhaust gas temperature and/or an exhaust gas flow rate.

In a further non-limiting embodiment of any of the foregoing assemblies, the first nozzle is different than the second nozzle.

In a further non-limiting embodiment of any of the foregoing assemblies, a thermo-chemical energy storage unit stores heat recovered from the heat exchanger.

In another exemplary embodiment, there is a method for injecting DEF into an exhaust component defining an exhaust gas flow path that receives exhaust gases from an engine, wherein the exhaust component comprises a housing defining an internal cavity configured to receive an exhaust gas after-treatment component, and the method comprises the steps of: providing a first chamber that is in fluid communication with the internal cavity upstream of the exhaust gas after-treatment component; associating a heat source with the first chamber; providing a first nozzle to introduce fluid into the first chamber; using a first valve to control flow of the fluid from the first chamber into the internal cavity; providing a second chamber that is in fluid communication with the internal cavity upstream of the exhaust gas after-treatment component, wherein the second chamber is a non-heated chamber; providing a second nozzle to introduce fluid into the second chamber; using a second valve to control flow of the fluid from the second chamber into the internal cavity; and controlling the first and second valves based on at least one predetermined operating condition comprising at least an exhaust gas temperature and/or an exhaust gas flow rate.

In a further non-limiting embodiment of the foregoing method, the heat source comprises an electrical heater, a heat exchanger, or a thermo-chemical energy storage unit that stores heat recovered from the heat exchanger; and/or the first nozzle is different than the second nozzle.

These and other features of this application will be best understood from the following specification and drawings, the following of which is a brief description.

DETAILED DESCRIPTION

Figure 1:
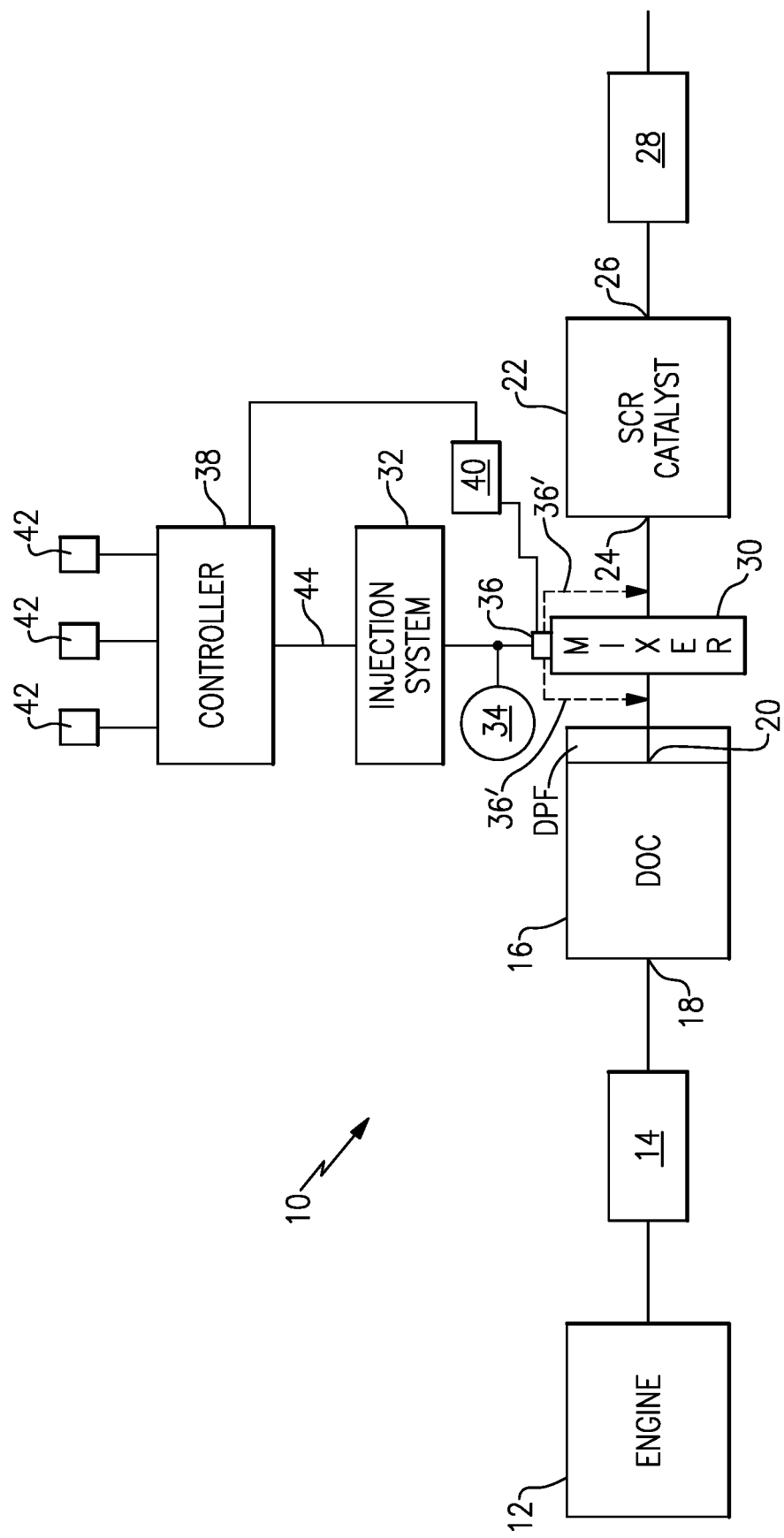
FIG. 1 schematically illustrates one example of an exhaust system with an injection system according to the subject disclosure.

FIG. 1 shows a vehicle exhaust system 10 that conducts hot exhaust gases generated by an engine 12 through various upstream exhaust components 14 to reduce emission and control noise as known. In one example configuration, the upstream exhaust component 14 comprises at least one pipe that directs engine exhaust gases into one or more exhaust gas aftertreatment components. In one example, the exhaust gas aftertreatment components include a diesel oxidation catalyst (DOC) 16 having an inlet 18 and an outlet 20, and an optional diesel particulate filter (DPF) that is used to remove contaminants from the exhaust gas as known. Downstream of the DOC 16 and optional DPF is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space. It should be understood that FIG. 1 is merely one example configuration and that other system architectures and other combinations of exhaust system components could be utilized.

In one example, a mixer 30 is positioned downstream from the outlet 20 of the DOC 16 or DPF and upstream of the inlet 24 of the SCR catalyst 22. The upstream catalyst and downstream catalyst can be in-line or in parallel, for example. The mixer 30 is used to facilitate mixing of the exhaust gas; however, in some configurations a mixer is not utilized.

An injection system 32 is used to inject a reducing agent, such as diesel exhaust fluid (DEF), for example, into the exhaust gas stream upstream from the SCR catalyst 22 such that the mixer 30 can mix the DEF and exhaust gas thoroughly together. Optionally, the injection system 32 can inject the DEF into the exhaust gas stream directly upstream of an exhaust gas after-treatment component, such as the SCR catalyst 22, for example. The injection system 32 includes a fluid supply tank 34, a doser 36, and a controller 38 that controls injection of the fluid as known. In one example, the doser 36 injects the DEF into the mixer 30 as shown in FIG. 1. In other examples, the doser 36 can inject the DEF into the exhaust system at other locations such as upstream or downstream of the mixer 30 as schematically indicated at 36'.

Providing ultra-low NOx emissions requires dosing at low temperatures to address de-nox at cold start and low load cycles. Dosing DEF at low temperatures raises thermolysis and deposit issues as there is usually insufficient heat from the exhaust gas to manage deposits. To address these issues, under certain operating conditions, the injection system 32 heats the DEF prior to entering the exhaust gas stream, which provides for faster atomization and better mixing.

A heating source 40 is associated with the injection system 32 and is used to selectively pre-heat the DEF prior to mixing with exhaust gas. The disclosed embodiments use various different heating sources 40 to heat the DEF. Pre-heating of the DEF occurs before the DEF is introduced into the exhaust gas stream and the heated DEF can be in the form of a liquid, gas, or a mixture of both. Under certain operating conditions, non-heated DEF is also injected into the exhaust gas stream.

A control system includes the controller 38 that controls heating of the DEF and/or injection of the DEF based on one or more of exhaust gas temperature, exhaust gas flow rate, backpressure, time, wear, etc. Additionally, there are a plurality of sensors 42 that can be used to determine temperatures through the system, flow rates, rate of deposit formation, and wear, for example. The sensors 42 communicate data to the controller 38 such that the controller 38 can determine when to generate a control signal that is communicated to the injection system 32 to control when DEF is to be injected in a heated or non-heated applications.

The controller 38 can be a dedicated electronic control unit or can be an electronic control unit associated with a vehicle system control unit or sub-system control unit. The controller 38 can include a processor, memory, and one or more input and/or output (I/O) device interface(s) that are communicatively coupled via a local interface. The controller 38 may be a hardware device for executing algorithms in software, particularly software stored in memory. The controller 38 can be a custom made or commercially available processor, or generally any device for executing software instructions.

Figure 2:
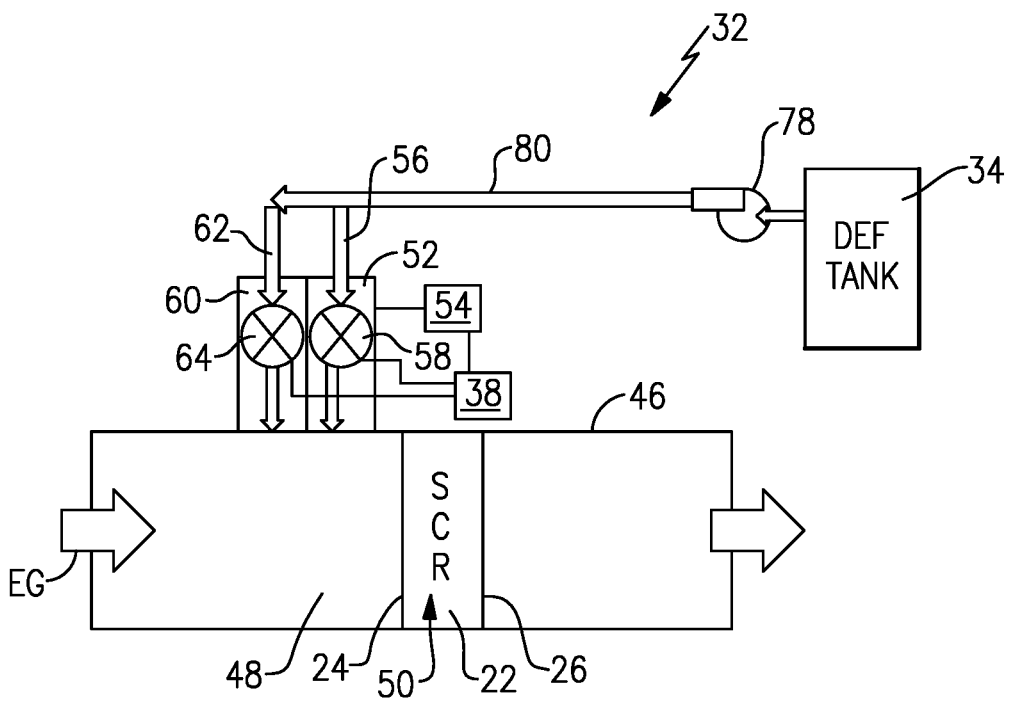
FIG. 2 is a schematic view of one example of an injection system with a hybrid doser.

FIG. 2 schematically shows one example of an injection system 32. A pipe or housing 46 defines an internal cavity 48 that is configured to receive an exhaust gas after-treatment component 50, such as a SCR catalyst 22 for example. Exhaust gas EG generated by the engine 12 enters the internal cavity 48. A first chamber 52 is in fluid communication with the internal cavity 48 upstream of the exhaust gas after-treatment component 50. A first nozzle 56 is used to introduce fluid into the first chamber 52. The heat source 40 is associated with the first chamber 52 or the first nozzle 56. In this example, the heat source 40 comprises an electrical heater 54 that is controlled by the controller 38. Any type of electrical heating element can be used for the electrical heater 54. A first valve 58 is used to control flow of the fluid from the first chamber 52 into the internal cavity 48.

A second chamber 60 is also in fluid communication with the internal cavity 48 upstream of the exhaust gas after-treatment component 50. The second chamber 60 is a non-heated chamber. A second nozzle 62 is used to introduce fluid into the second chamber 60. A second valve 64 is used to control flow of the fluid from the second chamber 60 into the internal cavity 48. The controller 38 controls the first 58 and second 64 valves based on one or more predetermined operating conditions.

In one example, the predetermined operating conditions comprise at least an exhaust gas temperature and/or an exhaust gas flow rate, which are measured via the sensors 42 and communicated to the controller 38. In one example, the predetermined operating condition comprises exhaust gas temperature, and the heat source 40 is used for the first chamber 52 and, when dosing is required, the controller 38 only opens the first valve 58 when the exhaust gas temperature is less than, for example, about 185° C. Accordingly, the controller 38 closes the first valve 58 and only opens the second valve 64 when the exhaust gas temperature is greater than or equal to about 185° C.

In one example, when dosing is required, the heat source 40 is used for the first chamber 52 and the controller 38 opens the first valve 58 when the exhaust gas temperature is less than a predetermined temperature such as about 180° C., for example. The controller 38 then opens the second valve 64 within an exhaust gas temperature transition range between approximately 180° C. and 200° C. such that both the first 58 and second 64 valves are open. The controller 38 closes the first valve 58 and leaves the second valve 64 open when the temperature of the exhaust gas is greater than or equal to approximately 200° C. These temperature ranges are examples and can be varied; however, the heat source is best utilized for low temperature and low load conditions. In one example, the first 58 and second 64 valves provide variable flow, and the controller 38 provides more flow from the first valve 58 if the exhaust gas flow rate is below a predetermined level. If the flow rate is higher, a more combined flow from both the first 52 and second 60 chambers will be used. There can also be variable flow ratios of heated and nonheated fluid.

Thus, the injection system 32 is configured to operate in a heated only mode, a non-heated mode only, and a combination mode where both heated and non-heated chambers are simultaneously used. The controller 38 is configured with a control algorithm that chooses the DEF flow path between the three different operating modes based on various operating conditions.

In one example, the first nozzle 56 is different than the second nozzle 62. During the heating mode, atomization happens within the first chamber 52 itself so the first nozzle 56 does not have to be able to further enhance atomization. In the non-heated chamber 60, the second nozzle 62 should be able to atomize the fluid into very small droplets of varying size as they exit the nozzle 62. In one example, the first nozzle 56 comprises a pass-through nozzle and the second nozzle 62 comprises a swirl tip nozzle.

Figure 3:
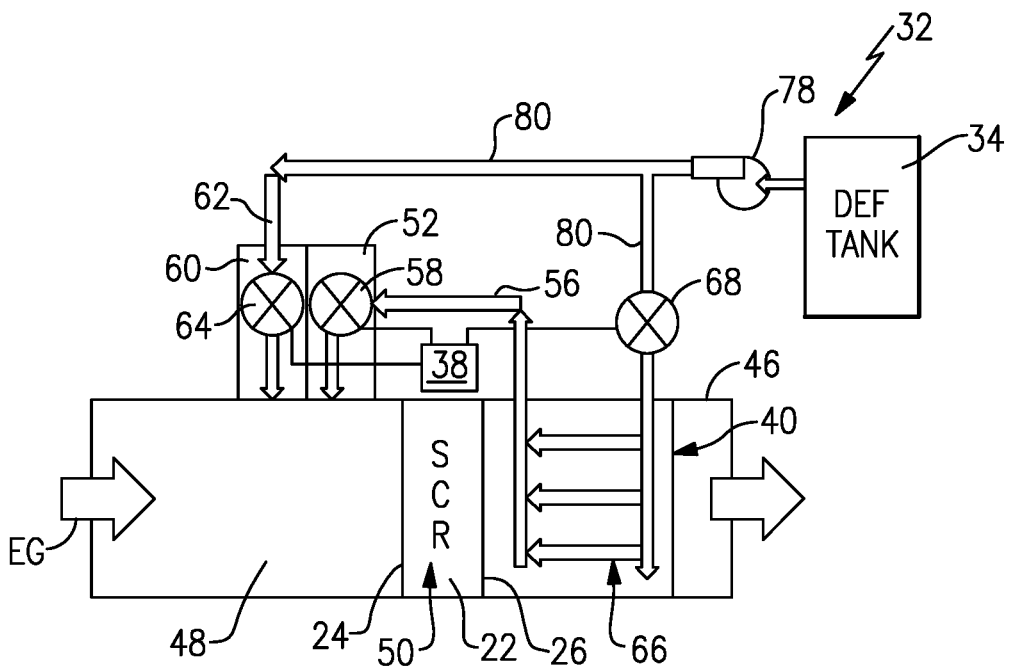
FIG. 3 is a schematic view of another example of an injection system with a hybrid doser.

In another example shown in FIG. 3, the heat source comprises a heat exchanger 66 where fluid heating is performed by recovering waste heat. The waste heat recovery replaces the electrical heater as used in the configuration of FIG. 2. The heat exchanger 66 recovers heat from exhaust gas flow downstream of the exhaust gas after-treatment component 50. Any type of heat exchanger suitable for use in a vehicle exhaust system can be used. A third valve 68 is selectively opened by the controller 38 to introduce the fluid from the fluid supply 34 into the heat exchanger 66 to be heated by the exhaust gas flow prior to being introduced into the first chamber 52. The controller 38 is configured with a control algorithm that chooses the fluid flow path between the three different operating modes based on various operating conditions as described above.

Figure 4:
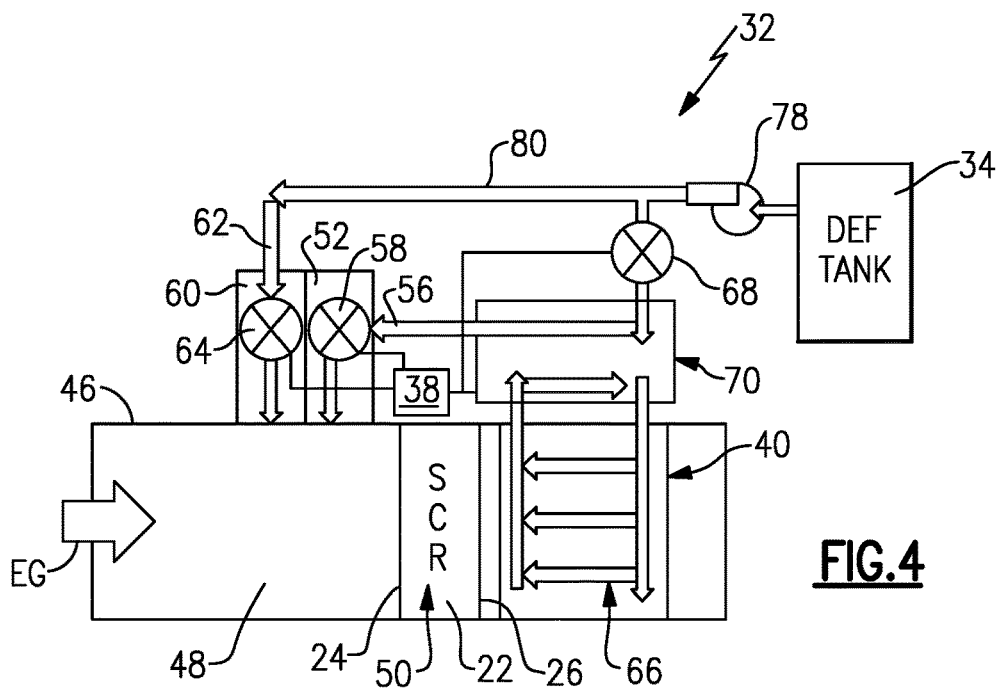
FIG. 4 is a schematic view of another example of an injection system with a hybrid doser.

In one example shown in FIG. 4, the injection system 32 further includes a thermo-chemical energy storage unit 70 that stores heat recovered from the heat exchanger. In one example, the fluid is heated using thermo chemical energy, and in another example the fluid is not heated and flows directly to injector. In one example, heat exchange exchanges heat between exhaust gas and thermo chemical storage. In one example, thermo chemical energy storage units are used to store energy to provide heat as needed. In one example, the heat exchanger exchanges heat from the thermochemical storage unit to fluid to be injected. The controller 38 is configured as needed to provide the desired operating mode. In one example, the third valve 68 is upstream of the thermo-chemical energy storage unit 70 such that fluid flows from the fluid supply 34 through the valve 68 and into the thermo-chemical energy storage unit 70. Examples of thermo chemicals used for thermochemical energy storage are Ca(OH)2 and Mg(OH)2; however, any type of thermo-chemical energy storage unit that is appropriate for a vehicle exhaust system can be used. The fluid then flows into the heat exchanger 66 where it is heated, and then flows back into the thermo-chemical energy storage unit 70 such that recovered heat can be stored for future use. The controller 38 is configured with a control algorithm that chooses the fluid flow path between the three different operating modes based on various operating conditions as described above.

Figure 5:
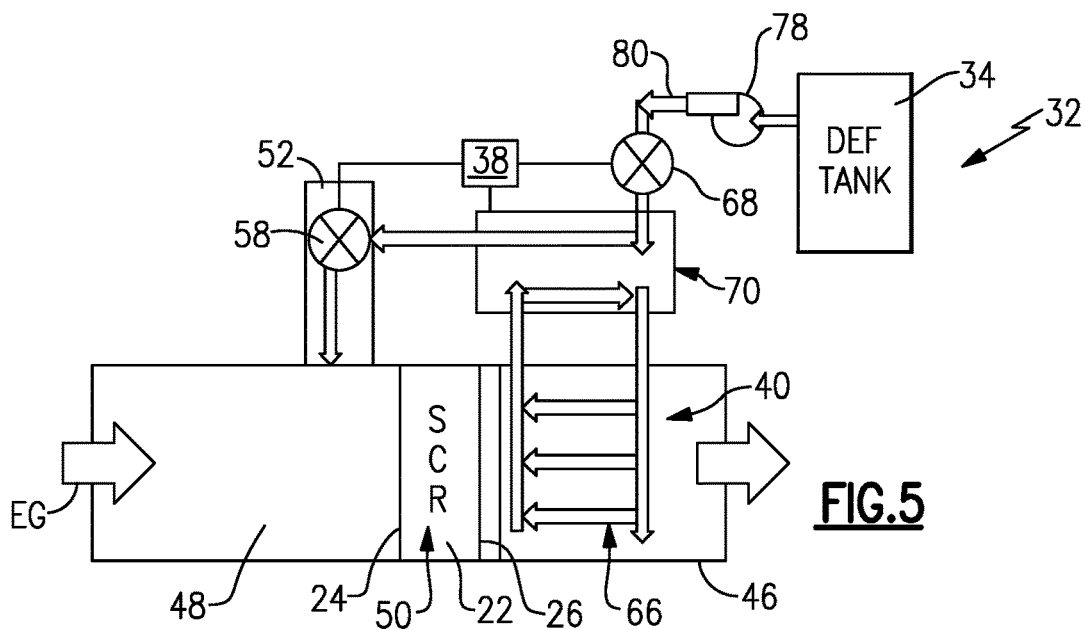
FIG. 5 is a schematic view of another example of an injection system with a hybrid doser.
Figure 6:
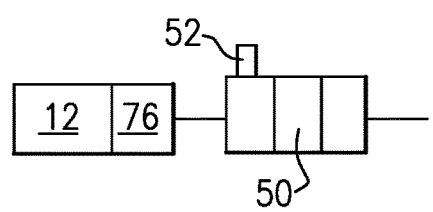
FIG. 6 schematically illustrates one example of an exhaust system as used with the injection system of FIG. 5.

FIG. 5 shows an example for a close-coupled arrangement that uses only the first chamber 52, i.e. there is only one single chamber. Heating of the dosing chamber 52 would only be needed under certain conditions in the close coupled application, such as low-NOx emissions for example. In this configuration, the single chamber and the exhaust gas after-treatment component 50 are at a location that is immediately downstream of an engine 12 or a turbocharger 76 as shown in FIG. 6. In this close-coupled arrangement there are no other intervening exhaust components between the after-treatment component 50 and the engine/turbocharger. This configuration provides reduced cost as only the one chamber is needed. In another example, the hybrid doser with an additional chamber can be used as discussed above for various scenarios based on a temperature based control algorithm, for example. The controller 38 is configured with a control algorithm that chooses the fluid flow path between the heating and non-heating operating modes based on various operating conditions as described above.

In each of the disclosed embodiments, the fluid supply 34 is upstream of the first 58, second 64, and/or third 68 valves. A pump 78 facilitates supply of the fluid to the first 58, second 64, and/or third 68 valves via connection lines 80.

The subject disclosure provides for an injection system that yields the best spray characteristics in heated and non-heated modes to address low temperature/low load conditions. As discussed above, the control algorithm is configured to determine when is the optimal time to dose heated or non-heated fluid based on the various operating conditions.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

The invention claimed is:

1. An exhaust component assembly for a vehicle exhaust system comprising:
   a housing defining an internal cavity configured to receive an exhaust gas after-treatment component;
   a first chamber that is in fluid communication with the internal cavity upstream of the exhaust gas after-treatment component;
   a first nozzle to introduce fluid into the first chamber;
   a heat source associated with the first nozzle or first chamber;
   a first valve to control flow of the fluid from the first chamber into the internal cavity;
   a second chamber that is in fluid communication with the internal cavity upstream of the exhaust gas after-treatment component, wherein the second chamber is a non-heated chamber;
   a second nozzle to introduce fluid into the second chamber;
   a second valve to control flow of the fluid from the second chamber into the internal cavity; and
   a controller to control the first and second valves based on at least one predetermined operating condition, and wherein the controller comprises a heated mode, a non-heated mode, and a combination mode where both the first chamber and the non-heated chamber are simultaneously used.

2. The exhaust component assembly according to claim 1, wherein the at least one predetermined operating condition comprises at least an exhaust gas temperature and/or an exhaust gas flow rate.

3. The exhaust component assembly according to claim 2, wherein, when dosing is required, the heat source is used for the first chamber and the controller only opens the first valve when the exhaust gas temperature is less than a predetermined temperature and/or the exhaust gas flow rate is below a predetermined flow rate.

4. The exhaust component assembly according to claim 3, wherein, when dosing is required, the controller closes the first valve and only opens the second valve when the exhaust gas temperature is greater than or equal to the predetermined temperature.

5. The exhaust component assembly according to claim 2, wherein, when dosing is required, the heat source is used for the first chamber and the controller opens the first valve when the exhaust gas temperature is less than 180° C. during the heated mode, and wherein the controller opens the second valve within an exhaust gas temperature transition range between 180° C. and 200° C. such that both the first and second valves are open during the combination mode, and wherein the controller closes the first valve and opens the second valve when the temperature of the exhaust gas is greater than or equal to 200° C. during the non-heated mode.

6. The exhaust component assembly according to claim 5, wherein the first and second valves provide variable flow, and wherein the controller provides more flow from the first valve if the exhaust gas flow rate is below a predetermined level.

7. The exhaust component assembly according to claim 2, wherein the first nozzle is different than the second nozzle.

8. The exhaust component assembly according to claim 2, wherein the heat source comprises an electrical heater and is controlled by the controller.

9. The exhaust component assembly according to claim 2, wherein the heat source comprises a heat exchanger that recovers heat from exhaust gas flow downstream of the exhaust gas after-treatment component, and including a third valve that is selectively opened by the controller to introduce the fluid from a fluid supply into the heat exchanger to be heated by the exhaust gas flow prior to being introduced into the first chamber.

10. The exhaust component assembly according to claim 2, including a fluid supply upstream of the first and second valves, and wherein the fluid comprises DEF.

11. An exhaust component assembly for a vehicle exhaust system comprising:
   a housing defining an internal cavity configured to receive an exhaust gas after-treatment component;
   a first chamber that is in fluid communication with the internal cavity upstream of the exhaust gas after-treatment component;
   a first nozzle to introduce fluid into the first chamber;
   a heat source associated with the first nozzle or first chamber, wherein the heat source comprises a heat exchanger that recovers heat from exhaust gas flow downstream of the exhaust gas after-treatment component;

a first valve to control flow of the fluid from the first chamber into the internal cavity;
a second chamber that is in fluid communication with the internal cavity upstream of the exhaust gas after-treatment component, wherein the second chamber is a non-heated chamber;
a second nozzle to introduce fluid into the second chamber;
a second valve to control flow of the fluid from the second chamber into the internal cavity;
a controller to control the first and second valves based on at least one predetermined operating condition, wherein the at least one predetermined operating condition comprises at least an exhaust gas temperature and/or an exhaust gas flow rate;
a third valve that is selectively opened by the controller to introduce the fluid from a fluid supply into the heat exchanger to be heated by the exhaust gas flow prior to being introduced into the first chamber; and
a thermo-chemical energy storage unit that stores heat recovered from exhaust gas.

12. The exhaust component assembly according to claim 11, wherein the third valve is upstream of the thermo-chemical energy storage unit such that fluid flows from the fluid supply through the third valve and into the thermo-chemical energy storage unit, then into the heat exchanger, and then back into the thermo-chemical energy storage unit such that recovered heat can be stored.

13. A vehicle exhaust component comprising:
a heat source to generate heat to provide a heated mode;
a first device to supply fluid in the heated mode, the first device including a first type of nozzle;
a second device to atomize fluid in a non-heated mode, the second device including a second type of nozzle different than the first type of nozzle;
an exhaust component defining an internal cavity that receives fluid from the first device and/or atomized fluid from the second device dependent upon exhaust gas temperature and/or exhaust gas flow rate;
wherein the first device comprises a first chamber configured to supply heated fluid to a first valve and the second device comprises a second chamber configured to supply non-heated fluid to a second valve; and
wherein the first nozzle comprises a pass-through nozzle and the second nozzle comprises a swirl tip nozzle.

14. An exhaust component assembly for a vehicle exhaust system comprising:
a housing defining an internal cavity configured to receive an exhaust gas after-treatment component;
at least one chamber that is in fluid communication with the internal cavity upstream of the exhaust gas after-treatment component;
a first nozzle to introduce fluid from a fluid supply into the at least one chamber;
a first valve to control flow of the fluid from the at least one chamber into the internal cavity;
a controller to control the first valve based on at least one predetermined operating condition;
a heat exchanger that recovers heat from exhaust gas flow downstream of the exhaust gas after-treatment component; and
a second valve separate from the first valve and that is selectively opened by the controller to introduce the fluid into the heat exchanger to be heated by the exhaust gas flow prior to being introduced into the first chamber.

15. The exhaust component assembly according to claim 14, wherein the at least one chamber comprises only one single chamber, and wherein the exhaust gas after-treatment component is in a close-coupled arrangement at a location that is immediately downstream of an engine or turbocharger.

16. The exhaust component assembly according to claim 14, wherein the at least one chamber comprises a first chamber that is associated with the first valve and the first nozzle, and a second chamber that is in fluid communication with the internal cavity upstream of the exhaust gas after-treatment component, wherein the second chamber is a non-heated chamber, and including
a second nozzle to introduce fluid into the second chamber,
a third valve to control flow of the fluid from the second chamber into the internal cavity, and
wherein the controller controls the first and third valves based on at least one predetermined operating condition comprising at least an exhaust gas temperature and/or an exhaust gas flow rate.

17. The exhaust component assembly according to claim 16, wherein the first nozzle is different than the second nozzle.

18. The exhaust component assembly according to claim 14, including a thermo-chemical energy storage unit that stores heat recovered from the heat exchanger.

19. A method for injecting DEF into an exhaust component defining an exhaust gas flow path that receives exhaust gases from an engine, wherein the exhaust component comprises a housing defining an internal cavity configured to receive an exhaust gas after-treatment component, and the method comprising the steps of:
providing a first chamber that is in fluid communication with the internal cavity upstream of the exhaust gas after-treatment component;
associating a heat source with the first chamber;
providing a first nozzle to introduce fluid into the first chamber;
using a first valve to control flow of the fluid from the first chamber into the internal cavity;
providing a second chamber that is in fluid communication with the internal cavity upstream of the exhaust gas after-treatment component, wherein the second chamber is a non-heated chamber;
providing a second nozzle to introduce fluid into the second chamber;
using a second valve to control flow of the fluid from the second chamber into the internal cavity;
controlling the first and second valves based on at least one predetermined operating condition comprising at least an exhaust gas temperature and/or an exhaust gas flow rate;
opening only the first valve in a heating mode, opening only the second valve in a non-heating mode, and opening both the first and second valves in a combination mode where both the first chamber and the non-heated chamber are simultaneously used.

20. The method according to claim 19, wherein:
the heat source comprises an electrical heater, a heat exchanger, or a thermo-chemical energy storage unit that stores heat recovered from the heat exchanger; and/or
the first nozzle is different than the second nozzle.

21. The method according to claim 19, including:
when the exhaust gas temperature is less than 180° C. opening the first valve during the heating mode, opening the second valve within an exhaust gas temperature transition range between 180° C. and 200° C. such that both the first and second valves are open during the combination mode, and closing the first valve and opening the second valve when the temperature of the exhaust gas is greater than or equal to 200° C. during the non-heated mode.

22. The exhaust component assembly according to claim 16, wherein the controller comprises a heated mode, a non-heated mode, and a combination mode where both the first chamber and the non-heated chamber are simultaneously used.

23. The exhaust component assembly according to claim 22, wherein the third valve is separate from the first valve, and wherein, when dosing is required, the heat exchanger is used for the first chamber and the controller opens only the first valve when the exhaust gas temperature is less than 180° C. during the heated mode, and wherein the controller opens both the first valve and the second valve within an exhaust gas temperature transition range between 180° C. and 200° C. such that both the first and second valves are open during the combination mode, and wherein the controller closes the first valve and opens the second valve when the temperature of the exhaust gas is greater than or equal to 200° C. during the non-heated mode.

* * * * *